United States Patent
Mercs et al.

(10) Patent No.: US 6,188,830 B1
(45) Date of Patent: Feb. 13, 2001

(54) AUDIOVISUAL EFFECTS PROCESSING METHOD AND APPARATUS FOR INSTANTANEOUS STORAGE-BASED PLAYBACK OF AUDIO DATA IN SYNCHRONIZATION WITH VIDEO DATA

(75) Inventors: James S. Mercs, Huntington Beach; Paul M. Embree, Irvine, both of CA (US)

(73) Assignees: Sony Corporation (JP); Sony Electronics, Inc.

( * ) Notice: Under 35 U.S.C. 154(b), the term of this patent shall be extended for 0 days.

(21) Appl. No.: 08/891,895

(22) Filed: Jul. 14, 1997

(51) Int. Cl.[7] ..................................................... H04N 5/76
(52) U.S. Cl. ................................................. 386/52; 386/55
(58) Field of Search .................................. 386/12, 13, 54, 386/48, 55, 75, 52, 4; 358/335; 370/94.2; 369/13, 14

(56) References Cited

U.S. PATENT DOCUMENTS

| | | | |
|---|---|---|---|
| 3,652,776 | 3/1972 | Milde, Jr. | 84/1.28 |
| 3,988,533 | 10/1976 | Mick et al. | 178/6.8 |
| 4,383,462 | 5/1983 | Nagai et al. | 84/1.26 |
| 4,479,416 | 10/1984 | Clague | 84/462 |
| 4,508,001 | 4/1985 | Suzuki | 84/1.01 |
| 4,565,999 | 1/1986 | King et al. | 340/706 |
| 4,573,390 | 3/1986 | Saito | 84/115 |
| 4,685,129 | 8/1987 | Gavriolovich | 379/324 |
| 4,819,164 | 4/1989 | Branson | 364/200 |
| 4,825,457 | 4/1989 | Lebowitz | 379/40 |
| 4,835,686 | 5/1989 | Furuya et al. | 364/200 |
| 4,857,912 | 8/1989 | Everett, Jr. et al. | 340/825 |
| 4,860,103 | 8/1989 | Azam et al. | 558/160 |
| 4,884,132 | 11/1989 | Morris et al. | 358/93 |
| 4,951,147 | 8/1990 | Aknar et al. | 358/209 |
| 4,958,552 | 9/1990 | Minamitaka et al. | 84/603 |
| 5,021,679 | 6/1991 | Fairbanks et al. | 307/66 |
| 5,132,968 | 7/1992 | Cephus | 370/94.1 |

(List continued on next page.)

FOREIGN PATENT DOCUMENTS

| | | |
|---|---|---|
| 4016 553 A1 | 11/1991 | (DE) . |
| 0 777 228 A2 | 6/1997 | (EP) . |
| 0 781 039 A2 | 6/1997 | (EP) . |
| 1 314 140 | 4/1973 | (GB) . |
| 2 274 223 | 7/1994 | (GB) . |
| 2 283 360 | 5/1995 | (GB) . |
| WO 93/21588 | 10/1993 | (WO) . |

OTHER PUBLICATIONS

Robert A. Pank "A Unified Approach for a TV Graphic Animation Suite" SMPTE Journal vol. 100, No. 9, Sep. 1, 1991, pp. 691–694.

(List continued on next page.)

*Primary Examiner*—Thai Tran
(74) *Attorney, Agent, or Firm*—Fulwider Patton Lee & Utecht, LLP

(57) ABSTRACT

The present invention overcomes the serious practical limitations inherent in presently-existing RAM-based audiovisual effects processing systems for essentially instantaneous playback of data. The method of the invention divides individual audio effects into two discrete segments, and stores these two segments in a distributed storage system. The first segment of an effect is stored in memory, allowing nearly instantaneous access and playback of this segment. The second segment is stored in a storage device with a relatively long access time. In operation, the first portion of the effect is played from memory, while the second portion is simultaneously retrieved from storage, such that the second portion is retrieved and is available for playback by the time the playing of the first segment terminates. Playback of these two segments in perfect succession effectively furnishes instantaneous playback of audio data, while reducing cost, facilitating loading of effects data, and providing further operational advantages. The disclosed method and apparatus is equally suitable for implementing essentially instantaneous playback of video or audiovisual data.

25 Claims, 3 Drawing Sheets

U.S. PATENT DOCUMENTS

| | | | |
|---|---|---|---|
| 5,140,690 | 8/1992 | Hata et al. | 395/575 |
| 5,144,544 | 9/1992 | Jenneve et al. | 363/21 |
| 5,144,661 | 9/1992 | Shamosh et al. | 380/9 |
| 5,150,100 | 9/1992 | Black et al. | 340/555 |
| 5,164,827 | 11/1992 | Paff | 358/108 |
| 5,185,667 | 2/1993 | Zimmerman | 358/209 |
| 5,202,759 | 4/1993 | Laycock | 358/108 |
| 5,218,704 | 6/1993 | Watts, Jr. et al. | 395/750 |
| 5,233,342 | 8/1993 | Yashiro et al. | 340/825.06 |
| 5,270,811 | 12/1993 | Ishibashi et al. | 358/108 |
| 5,272,527 | 12/1993 | Watanable | 358/108 |
| 5,278,347 | 1/1994 | Konishi | 84/613 |
| 5,287,353 | 2/1994 | Buda et al. | 370/85.1 |
| 5,287,789 | 2/1994 | Zimmerman | 84/477 R |
| 5,327,233 | 7/1994 | Choi | 348/152 |
| 5,379,441 | 1/1995 | Watanabe et al. | 395/800 |
| 5,418,969 | 5/1995 | Matsunaki | 395/750 |
| 5,459,849 | 10/1995 | Bergkvist, Jr. et al. | 395/403 |
| 5,463,183 | 10/1995 | Konno | 84/604 |
| 5,502,727 * | 3/1996 | Catanzaro et al. | 370/94.2 |
| 5,517,892 | 5/1996 | Fujimori | 84/462 |
| 5,568,275 * | 10/1996 | Ballantyne et al. | 358/335 |

OTHER PUBLICATIONS

Morris Jaslowitz et al. "Sound Genietm—An Automated Digital Sound Effects Library System" SMPTE Journal, vol. 99, No. 5, May 1, 1990, pp. 386–391.

John Watkinson "Digital Audio" Journal of the Audio Engineering Society, ISSN 0004–7554, vol. 36, No. 6, Jun. 1988, pp. 492–508.

Yasmin Hashmi "Tapeless Recording and Editing " Image Technology (Journal of the BKSTS), vol. 73, No. 10, Oct. 1, 1991, pp. 406–408.

Alan Marr "Computer Aided Film Sound Editing" The 76$^{th}$ Convention of the AES, New York, Oct. 8–11, 1984, Preprint 2115 (C–3), pp. 1–11.

B. Croney "Digital Audio in Post Production" Image Technology (Journal of the BKSTS), vol. 74, No. 6, Jul. 1, 1992, pp. 108–109.

B. Kelly "The Limits of Digital Audio in Film Post–Production" Intellectual Leverage, San Francisco, Feb. 24–28, 1992, No. Conf. 37, Feb. 24, 1992, pp. 466–471.

F. W. Blair et al., IBM Technical Disclosure Bulletin, Management of Large Numbers of Assembled Programs, pp. 3259–3261, vol. 13 No. 11 (Apr. 1971).

* cited by examiner

AUDIOVISUAL EFFECTS PROCESSING METHOD AND APPARATUS FOR INSTANTANEOUS STORAGE-BASED PLAYBACK OF AUDIO DATA IN SYNCHRONIZATION WITH VIDEO DATA

BACKGROUND OF THE INVENTION

1. Field of the Invention

The present invention relates to apparatus and methods for structured data storage, retrieval, and utilization, and more particularly, to storage-based techniques for implementing virtually instantaneous playback of audio effects data in synchronization with playback of associated video data in an audiovisual effects processing system.

2. Art Background

The development of audiovisual works often involves processing of the audio portions of a work independent of the processing of the corresponding video portions of the work. In the film industry, for example, it is common practice to substitute synthetic sounds, produced in a sound laboratory, for the actual sounds that were recorded during recording of the visual portions of a film. These synthetic audio portions are then combined with the associated video portions of the film, resulting in a single audiovisual work, on the basis of time codes which are used to relate each particular audio portion (i.e., each individual sound) to the video portion related to that sound.

The relation between a multiplicity of recorded sounds and their video counterparts is commonly represented by an edit decision list (EDL), which lists each effect along with the time in the work at which each effect is utilized. A hypothetical EDL might reflect, for example, that a door would slam at one minute, five seconds, and 6 frames into the work, and that a footstep would be heard at one minute, six seconds, and 15 frames. When the visual portion of the work is reviewed, the sounds listed in the EDL must be accessed and played at the particular times identified in the EDL. In playing these sounds, the margin for error in playback time is very small. In particular, a sound must be played back with a near-zero delay (i.e., instantaneously) from the time at which that sound is requested. As used herein, the term "instantaneous" refers to delays not noticeable to the typical human, such as the access times of many volatile memory devices such as commonly available random access memory (RAM), as contrasted with the access times of storage devices such as hard disk drives which are often noticeable by a user.

Presently existing designs for such film effects systems impose severe practical limitations upon the functionality, and therefore upon the value, of these systems. These limitations are best understood by examining the procedures involved in the use of such systems by audio engineers. A typical feature-length movie contains at least 50 scenes, each of which might contain hundreds of individual sound effects. To accommodate the audio data representing these sound effects, present professional systems are considered to require a minimum of 250 megabytes of RAM, and such systems often provide substantially more memory for instantaneous playback, typically in excess of a gigabyte.

Before editing a particular audiovisual sequence with present systems, all the sound effects that may potentially be used in that sequence must first be loaded into RAM. This process often requires load times in excess of one hour for lengthy sequences. Pre-loading is customarily required so that sound engineers do not have to plan ahead to load each effect just prior to their utilization of that effect, and to load only the effects needed for the sequence. Additionally, the basic nature of the sound engineering process requires frequent rearrangement of effects, continual reassignment of effects to different portions of a scene, and repeated addition and removal of whole effects to and from a scene. Consequently, an effects system that did not pre-load all effects for a particular scene would simply be impracticable.

The use of RAM in such systems has several inherent problems. First, the substantial quantity of RAM required is very expensive, particularly when compared to the cost of alternative techniques for data storage. The RAM used in professional audio effects systems is high-end static RAM, which is more costly than typical dynamic RAM used in computer systems. In the present market, a gigabyte of such RAM may cost between seven and ten thousand dollars, as compared with approximately two hundred dollars for a gigabyte of hard drive storage. Unfortunately, until the advent of the present invention, these alternative techniques did not allow instantaneous playback of stored data, so use of these less expensive storage devices was not practicable.

Second, the use of volatile memory such as RAM required that all stored sound effects, in their entirety, be reloaded in the event that power to the effects system was interrupted, once again necessitating a lengthy loading process. In response to this limitation, it has become common practice in the industry to never voluntarily shut off such effects systems. Therefore, if power to these systems was ever shut off, it would be quite laborious in many cases to properly reconfigure the systems once power was returned, particularly in light of the many unsaved modifications likely to have been made since the data was last loaded.

Finally, with the ever-increasing demand for higher sampling rates (requiring more data storage space) and the escalating prevalence of sound effects usage in audiovisual works, the aforementioned problems will certainly be compounded in the future, as long as RAM-based effects systems remain the standard.

SUMMARY OF THE INVENTION

The present invention is designed to overcome the serious practical limitations inherent in presently-existing RAM-based systems for instantaneous playback of audio effects. This goal is achieved by dividing each sound effect into two discrete segments, and storing these two segments in a distributed storage system. The first segment of an effect is stored in a memory with a very short access time, allowing nearly instantaneous access and playback of this segment. The second segment is stored in a storage device with an access time relatively greater than that of the memory, but providing data storage at a much lower cost-per-bit than the memory.

In operation, when an effect must be played, the first portion of the effect is played from memory, while the second portion is retrieved from storage, such that the second portion is retrieved and is available for playback at the instant that the playing of the first segment terminates. Because the two segments of an effect are played in perfect succession, the system effectively furnishes seamless and instantaneous playback of audio data.

Specifically, the present invention provides a method and apparatus for virtually instantaneous playback of audio effects that is substantially less expensive than existing systems, yet provides improved performance. The present invention, inter alia, provides a non-volatile memory for sound effects, and allows loading multiple effects in a much shorter time than prior systems, while not diminishing system performance in other respects.

DETAILED DESCRIPTION OF THE INVENTION

The present invention provides cost effective methods and apparatus for providing essentially instantaneous playback of audio effects, while yielding improved performance over prior systems.

The detailed descriptions which follow are presented largely in terms of methods and algorithms for manipulation and transfer of data within a computer-based system. These descriptions and representations are the means used by those skilled in the art of computer-based effects processing systems design to convey the substance of their work to others skilled in the art.

Figure 1:
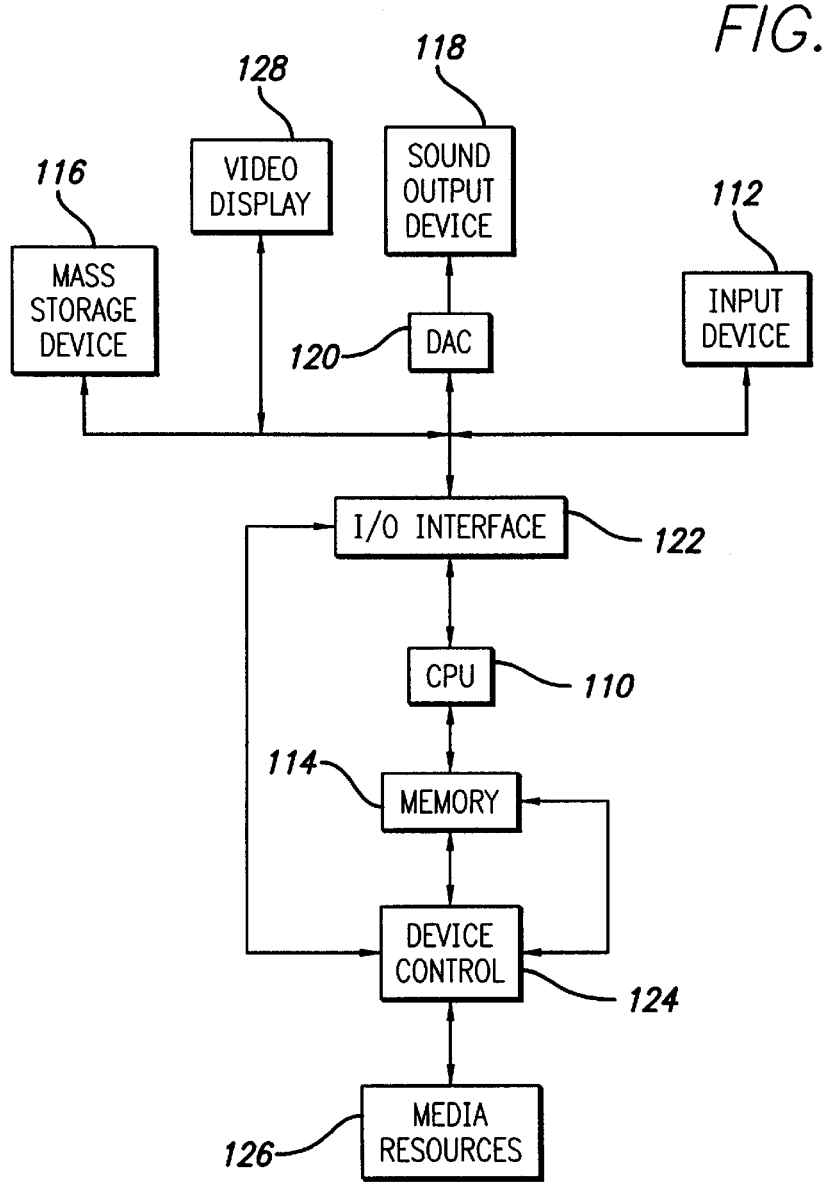
FIG. 1 is a functional block diagram illustrating one embodiment of the principal hardware components used to implement the present invention.

FIG. 1 illustrates the hardware used to implement the inventive system disclosed herein. The hardware comprises a central processing unit (CPU) 110, coupled to a memory 114. Because this memory is used in some embodiments to store audio data, one implementation of this system for use by professional audio engineers preferably utilizes static random access memory (RAM). This RAM offers improved performance ideal for the present application, although the cost of such RAM may be slightly higher than the cost of traditional dynamic RAM. Additionally, the CPU is coupled to an input/output (I/O) interface 122 which is used to communicate information in appropriately structured form to and from other portions of the hardware. In particular, the I/O interface communicates information from the CPU to a mass storage device 116 for storing data. This storage device is a common hard disk drive in one embodiment, but other embodiments may utilize other storage devices, including without limitation optical drives, CD-ROM drives, and DVD drives. The storage device, as will become apparent, has a relatively long seek time compared to the memory device, but provides a large quantity of storage at a relatively low price. In fact, one of the primary incentives for using a storage device rather than memory is the low cost-to-storage capacity ratio of such storage devices, particularly when compared to that of RAM. The CPU is additionally connected through the I/O interface to an input device 112, such as a keyboard, a mouse, a trackball, or in some embodiments, a microphone able to receive sound input. Finally, the CPU is connected through the I/O interface to a digital-to-analog converter SAC) 120, which itself is connected to a sound output device 118 such as a loudspeaker for output of sound effects. The DAC converts a digital signal into an output usable by the output device. Finally, a device control interface 124 is coupled to both the memory 114 and the I/O interface 122, to permit the system to communicate with and control media resources 126. For example, in an audiovisual effects processing environment, the media resources 126 may comprise video editing devices, video recording or playback devices, or other effects processing resources. It will be appreciated that other common computer peripherals may be coupled to the hardware, such as a computer network interface. Finally, the CPU is connected through the I/O interface to a video display 128 for display of video data.

Before use of the present invention, any audio effects data existing in an analog form must first be converted to digital form. This conversion may be accomplished in accordance with techniques and using apparatus well-known to those in the art for digitization of analog audio data.

Next, the system must be initialized pursuant to the "initialization" process described herein. In this initialization process, the totality of the effects data, or in some instances, only the effects data used for a particular scene, is stored in digital form on a storage device 116. Preferably, each of the effects would be stored sequentially on the storage device in a manner in which the storage device access times between each of the stored effects is minimized.

Additionally, system performance may be enhanced by storing the effects data in the portions of the storage device which allow the fastest access times and data transfer rates. If a hard disk drive were used for storage, for example, the data should optimally be stored in the sectors of that drive which allow an optimal combination of the fastest seek time and the fastest read rates. These characteristics vary among drives made by different manufacturers, and often even among the models produced by single manufacturers, so the optimal storage scheme should be determined based upon the attributes of the particular drive used.

Once the system has been initialized pursuant to the above-described initialization process, future initialization is not required unless the contents of the stored data are changed, since in most cases the storage device 116 used to store the data will be non-volatile in nature. Thus, interruption of power to the system will not require re-initialization, as contrasted with systems that store the entirety of the effects data in RAM.

Subsequent to system initialization, portions of each effect are loaded into memory, pursuant to a "loading" process. Before discussing this loading process, however, some background regarding the structure of each piece of audio effect data is required.

Figure 2:
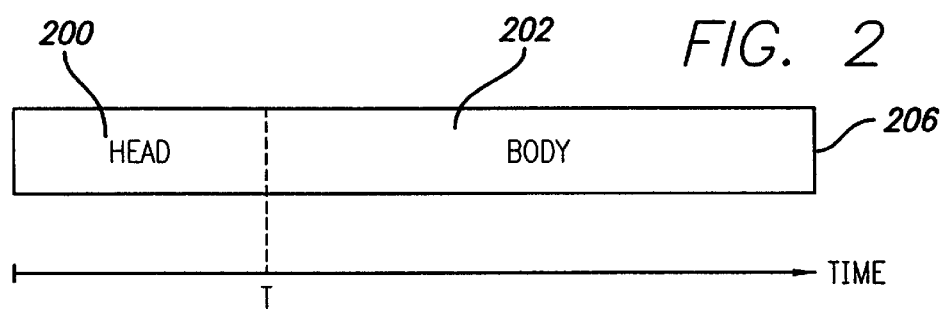
FIG. 2 is a time-based diagram of the components of the data representing a typical sound effect.

As illustrated in FIG. 2, the data describing each effect 206 consists of a head segment 200 and a body segment 202. The head segment pertains to a first (in time) portion of the effect, from the beginning of the effect until time T, and the body segment pertains to the remaining portion, from time T until the end of the effect. The time T is determined with reference to the data access performance characteristics of the storage device and by a consideration of desirable safety margins. As will be more completely described below, the system loads the head segment into memory, while the body segment remains on the storage device. When a user of the system requests that the effect be played, the system immediately begins playing the head segment from memory, while concurrently retrieving the body segment from storage and transferring it to memory. The memory to which the body segment is transferred may be either the same or a different memory than the memory in which the head segment is stored. The body segment must be retrieved by the time the head segment has finished playing, and the delay in reading the body segment is attributed almost entirely to the retrieval time of the storage device. If a typical hard drive is used for storage, this retrieval time is the access time. Commonly available hard disk drives presently have an average access time of approximately 7–20 milliseconds, but worst-case random access time of slower optical storage devices (such as magneto optical drives) may exceed 200 milliseconds. Therefore, with such storage devices, a time T of approximately 250 milliseconds, or 0.25 seconds is preferred, so that there is no gap between the playing of the head segment and the body segment. Because a delay of 0.25 seconds is easily recognized by the human ear, a system utilizing only a storage medium and no memory, as opposed to the presently disclosed system, is simply impracticable for use with professional sound engineering applications. The novel design of the present system provides nearly instantaneous playback of effects, delayed only by the access time of the memory device it uses. For all practical purposes, typical RAM random access delays of 50 to 200 nanoseconds, and sequential access delays of 30 to 70 nanoseconds, are far too short to be noticeable to human listeners. The present system therefore provides an ideal solution to problems posed by prior systems.

Figure 3:
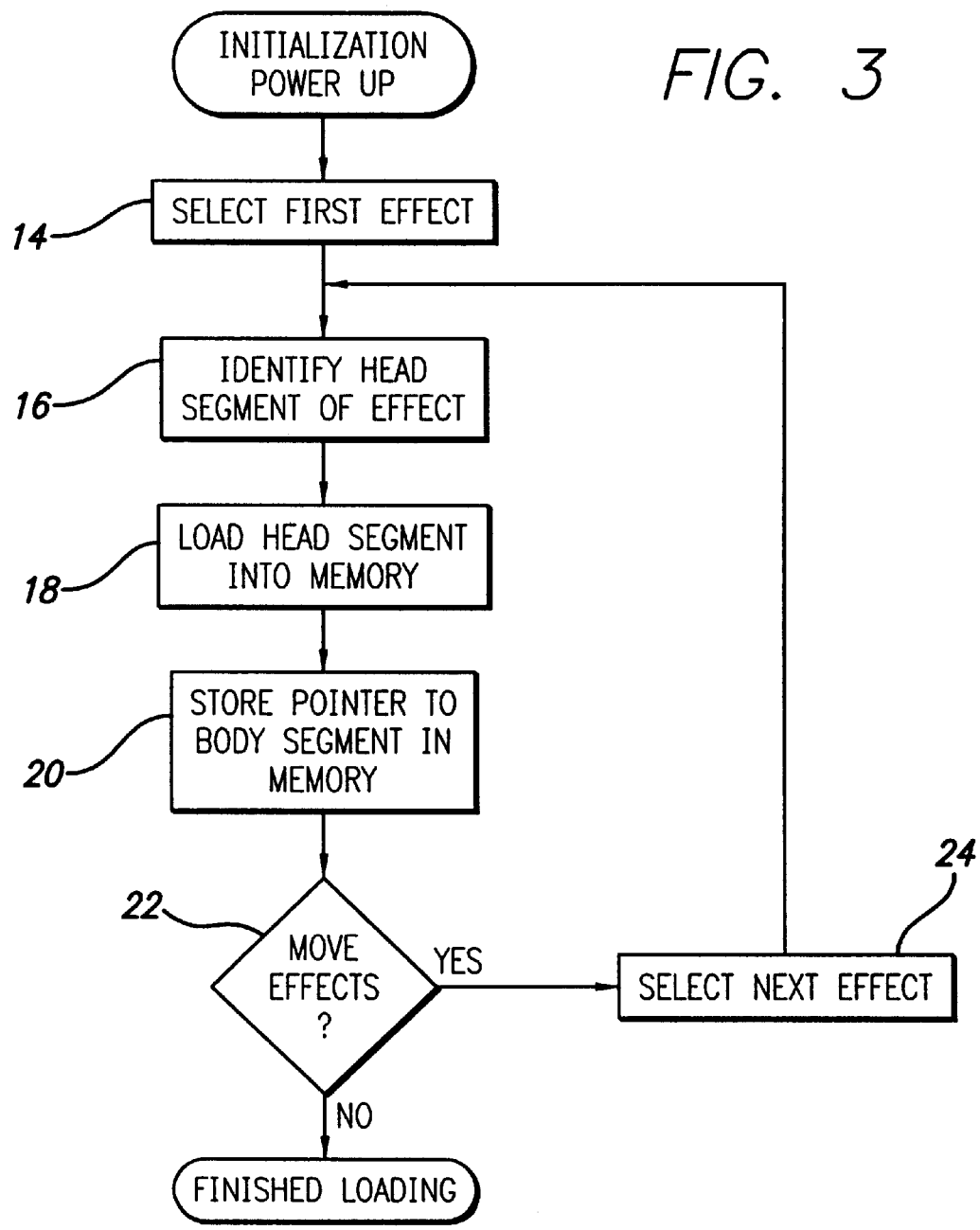
FIG. 3 is a flow chart illustrating the steps involved in loading the effects data into the system.

After the system has been initialized as described above, and before use, the segments of the effects data must be loaded pursuant to the loading process illustrated in FIG. 3. This loading process begins, in Block 14, with the selection of the first effect. After an effect is selected by the user, in Block 16 the head segment of that effect is identified, as described above. Then, in Block 18, the identified head segment of the effect is loaded in memory. Furthermore, in Block 20, a pointer to the body segment corresponding to the head segment that was loaded into the storage device in Block 18 is also stored in memory, so that the body segment associated with the stored head segment may be identified and accessed. At this juncture, the entire head segment of one effect has been loaded. Next, in Block 22, the system loading process determines whether any additional effects require loading. If so, in Block 24, the next effect is selected, and the above-described process is repeated with respect to that selected effect, beginning with Block 16. Preferably, each of the effects is stored sequentially after the previously-stored effect.

Once all effects have been loaded into the system, the system loading process is complete, and the system is available for virtually instantaneous playback of the stored effects segments. While existing RAM-based systems must load each effect in its entirety into RAM before use of the system, often resulting in delays in excess of one hour, the present system merely loads the head segments into memory, potentially decreasing system load time by several orders of magnitude.

Figure 4:
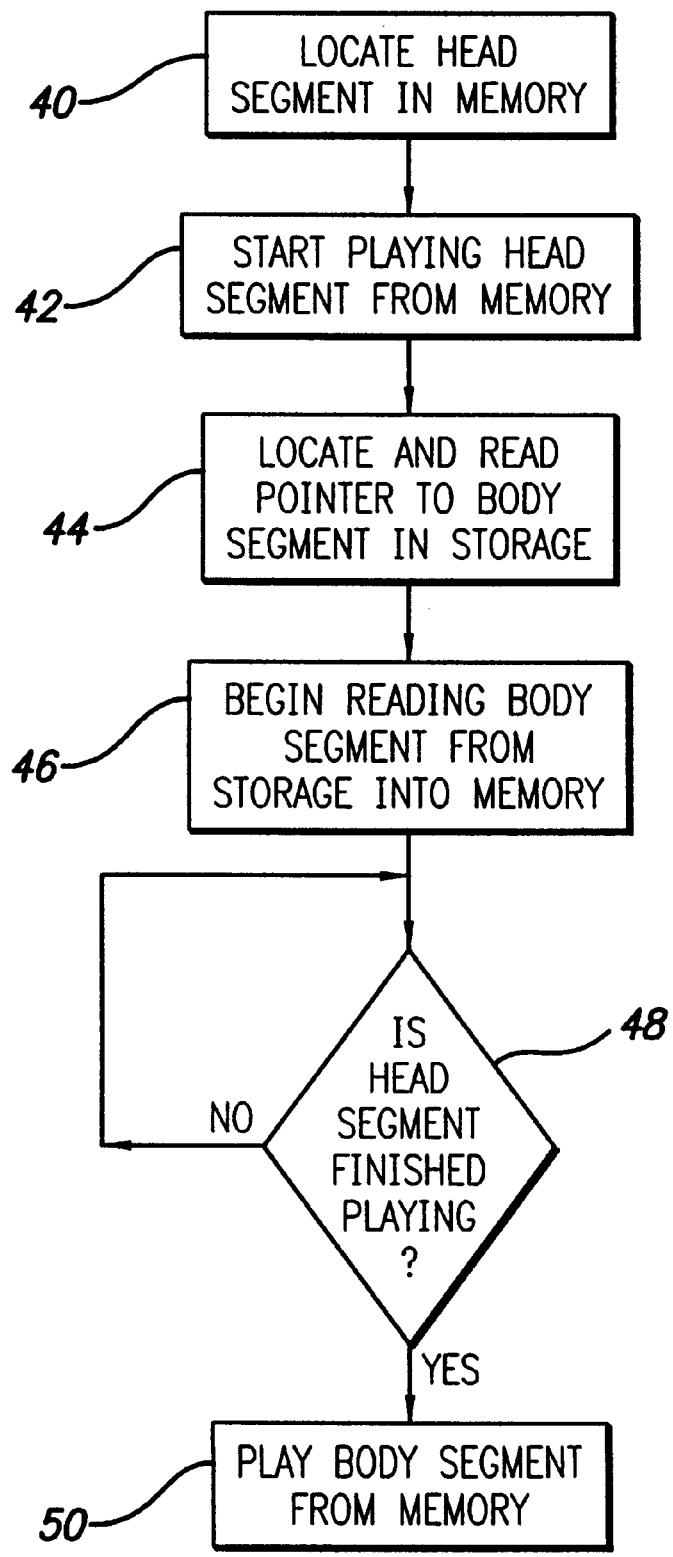
FIG. 4 is a flow chart illustrating the steps involved in playback of effects by the system.

FIG. 4 conceptually illustrates the steps involved in the virtually instantaneous playback of the stored effects. In Block 40, when the user commands the system to play an effect, or when the time arrives for the playing of an effect as determined by an EDL or similar time-based listing, the system first locates the head segment of the effect in memory. Information relevant to playback of an effect include time to start, duration, pitch, amplitude, and loudness. Next, in Block 42, the system starts playing the head segment from memory. This playing operation involves retrieval by CPU 110 of the effect data from memory 114, and subsequent output of the effect data in digital form from the CPU to the I/O interface 122, and then from the I/O interface to the DAC 120, which converts the data into analog form and then relays the analog data to a sound output device 118 for listening by the user. The system may, at the option of the user, additionally store the output data for later use. Concurrent with the playback of the audio data, the system may command a related media resource device to record or playback other data as desired by the user. Control over such a secondary media resource device is maintained through the use of a device control 124 which relays commands input by the user or generated by the CPU 110 to that media resource 126.

In Block 44, at some point in time while the system is playing the head segment from memory, it concurrently locates and reads the pointer to the corresponding body segment that is stored in storage. Thereafter, in Block 46, the system begins to read this corresponding body segment from the storage device and into memory. For proper operation, this body segment-reading task must be initiated before the playback of the head segment has finished, and the transfer rate from the storage medium must be great enough so that the body segment data is not required for output from the system before it has been read from storage. Present hard drive transfer rates are more than sufficient to meet the latter requirement, and as discussed above, head segment lengths are predetermined to assure satisfaction of the former requirement. In Block 48, while reading the body segment from the storage device, and thereafter if the reading of the body segment is completed prior to the playing of the head segment, the system queries whether the head segment has finished playing. In Block 50, when the system has finished playing the entire head segment, it immediately plays the body segment, this segment having been at least partially transferred to memory by the time it must be played, as discussed above. Because the head segment and the body segment are played in direct succession, there is no gap between the playing of the two segments, and consequently there is no need to cross-fade between the two signals. Playback of the entirety of the body completes the playback process.

This invention is suitable for use not only with dedicated audiovisual editing systems, but may be implemented in conjunction with many general purpose computer systems, including without limitation common multimedia desktop computer systems.

Furthermore, the invention may be embodied to realize the benefits of computer networks that have become a conventional mode of modern computing. Specifically, the system is entirely compatible with a system in which the head segments are stored in local memory, while the body segment data resides on remote storage devices that are accessed via a computer network. Such an implementation requires consideration of the access time of the remote storage device, taking network delays into account. As a result of these additional delays, the head segment time T must be increased accordingly. Except for these differences, the system would perform in substantially the same manner as the non-network version described above. This networked embodiment would allow a user potential access to a larger library of effects data, and could allow multiple users to simultaneously access a single central storage device.

Finally, while the above description has solely addressed processing of audio data, the invention is equally applicable to storage and playback of video data in synchronization with audio data (i.e., audiovisual playback). Audiovisual effects editing and playback systems, configured as described herein, are capable of providing such a feature. In one embodiment, the additional visual component of such audiovisual data is stored and played back just as if it were audio data, with one exception. Namely, because video data cannot meaningfully be played back through sound output device 118, the video portions of the audiovisual data are output from the CPU 110, through the I/O interface 122, and to the video display 128, where they may be viewed by the user. Synchronous playback of corresponding audio and video portions may be achieved in such an embodiment through the simultaneous initiation of playback of these two portions. Furthermore, it is likewise recognizable by those skilled in the art of audiovisual processing systems design that the presently disclosed invention may be employed with respect to purely visual data having no audio component.

While this invention has been particularly described with reference to a preferred embodiment thereof, it will be understood by one skilled in the art that the present system may be practiced without many of the specific details disclosed above, and that changes in the above description or illustrations may be made with respect to form or detail without departing from the spirit and scope of the invention.

What is claimed is:

1. A method for processing a plurality of effects described by data, wherein each effect is describable by data describing a first portion and a second portion, in a system which comprises an apparatus for the distributed storage and access of data, adapted to provide playback of effects described by the data, including first means for storing data describing a first portion of an effect and for accessing and reading data at a first access time and read rate, and second means for storing data describing a second portion of the effect and for accessing and reading data at a second access time and read rate different from the first access time and read rate, wherein the first effect portion comprises the extent of the effect for a period of time which is equal to or longer than the period of time for accessing and reading the second effect portion for output thereof, dependent upon the second access time and read rate for access and reading data from the second means, the system further comprising means for initiating output of the first effect portion when output of the effect is requested, means for initiating accessing and reading of the second effect portion prior to the completion of the output of the first effect portion, and means for initiating output of the second effect portion upon the completion of the output of the first effect portion, wherein the method comprises:

loading data describing a first portion of an effect in the first means in the apparatus;

loading data describing a second portion of the effect in the second means in the apparatus;

initiating output of the first effect portion when output of the effect is requested;

initiating access and reading of the second effect portion prior to completion of the output of the first effect portion; and initiating output of data from the second effect portion at the conclusion of the output of the first effect portion.

2. The method of claim 1, comprising a method for storing audio data in a distributed storage system and providing essentially instantaneous playback of audio effects described by the audio data, in an audiovisual effects processing system.

3. The method of claim 1, comprising a method for storing video data in a distributed storage system and providing essentially instantaneous playback of video effects described by the video data, in an audiovisual effects processing system.

4. The method of claim 1, further comprising the step of:

after initiating access of the storage device, and before the conclusion of the output of the first portion of the effect, initiating reading of the second portion of the effect and, as the second portion of the effect is thereby read, loading data from the read second portion into a memory device having a shorter access time than the storage device.

5. The method of claim 1, further comprising the step of:

after storing the first portion of the effect, storing a pointer identifying the storage location of the second portion of the effect; and prior to initiating output of the second portion of the effect, reading the pointer and identifying the second portion of the effect on the basis of the pointer.

6. The method of claim 1, further comprising the step of:

prior to the step of storing data describing a first portion of an effect, identifying the first portion and the second portion of the effect.

7. The method of claim 1, wherein output of the effect is requested pursuant to an edit decision list.

8. The method of claim 1, further comprising the step of synchronizing the effect with data for simultaneous playback.

9. The method of claim 1, wherein the memory means is a volatile memory device, and wherein the storage means is a non-volatile storage device.

10. The method of claim 1, wherein the memory means is RAM, and wherein the storage means is a hard disk drive.

11. The method of claim 1, wherein the memory means is RAM, and wherein the storage means is a digital video disk.

12. The method of claim 1, wherein the memory means is RAM, and wherein the storage means is a super compact disk.

13. The method of claim 1, wherein the memory means is RAM, and wherein the storage means is a magneto optical drive.

14. The method of claim 1, wherein the data describing a second portion of the effect is stored in portions of the storage device, the portions chosen in accordance with a consideration of the varying access times and read rate characteristics of different portions of the storage device, so as to optimize the subsequent retrieval time of the stored data.

15. The method of claim 1, wherein the storage device is located at a remote location and wherein the data transferred to and from the storage device is transferred over communication channels, the communication channels comprising part of a computer network.

16. The method of claim 4, wherein the step of identifying the first portion and the second portion is performed so that the output of the second portion may be accomplished in succession with the output of the first portion.

17. The method of claim 9, wherein the data describing a second portion of the effect is stored in particular sectors of the hard disk drive, the particular sectors chosen in accordance with a consideration of the varying access times and read rate characteristics of different sectors of the hard disk drive, so as to optimize the subsequent retrieval time of the stored data.

18. The method of claim 15, wherein the computer network allows multiple users to simultaneously access data residing on a common storage device.

19. The method of claim 1, wherein the first means comprise memory means, and the second means comprise storage means, and wherein loading the first effect portion in the first means comprises loading the first effect portion in the memory means, loading the second effect portion in the second means comprises loading the second effect portion in the storage means, initiating access of the first effect portion comprises initiating access of the first effect portion from the memory means, and initiating output of the second effect portion comprises initiating output of the second effect portion from the storage means.

20. The method of claim 1, further comprising means for initiating accessing of the second effect portion prior to the completion of the output of the first effect portion and means for loading the accessed second effect portion for output thereof, and further comprising initiating accessing of the second effect portion prior to completion of the output of the first effect portion, and loading the accessed second effect portion for output thereof.

21. A system for processing a plurality of effects described by data, wherein each effect is describable by data describing a first portion and a second portion thereof, comprising:
an apparatus for the distributed storage of data, adapted to provide playback of effects described by the data, including:
first means for storing data describing a first portion of an effect and for accessing and reading data at a first access time and read rate;
second means for storing data describing a second portion of the effect and for accessing and reading data at a second access time and read rate different from the first access time and read rate;
wherein the first effect portion comprises the extent of the effect for a period of time which is equal to or longer than the period of time for accessing and reading the second effect portion for output thereof, dependent upon the second access time and read rate for accessing and reading data from the second means, the system further comprising;
means for initiating output of the first effect portion when output of the effect is requested;
means for initiating accessing and reading of the second effect portion prior to the completion of the output of the first effect portion; and
means for initiating output of the second effect portion upon the completion of the output of the first effect portion.

22. The system of claim 21, comprising an apparatus for the distributed storage of audio data, the apparatus capable of providing essentially instantaneous playback of audio effects described by the audio data, in an audiovisual effects processing system.

23. The system of claim 21, comprising an apparatus for the distributed storage of video data, the apparatus capable of providing essentially instantaneous playback of video effects described by the video data, in an audiovisual effects processing system.

24. The system of claim 21, wherein the first means comprise memory means, and the second means comprise storage means.

25. The system of claim 21, further comprising means for initiating accessing of the second effect portion prior to the completion of the output of the first effect portion, and means for loading the accessed second effect portion for output thereof.

* * * * *

UNITED STATES PATENT AND TRADEMARK OFFICE
CERTIFICATE OF CORRECTION

PATENT NO. : 6,188,830 B1
DATED : February 13, 2001
INVENTOR(S) : James S. Mercs, Paul M. Embree It is certified that error appears in the above-identified patent and that said Letters Patent is hereby corrected as shown below:

<u>Column 3,</u>
Line 56, change "SAC), to read -- (DAC) --.

Signed and Sealed this

Second Day of October, 2001

Attest:

NICHOLAS P. GODICI
Attesting Officer — Acting Director of the United States Patent and Trademark Office